Patented Nov. 28, 1922.

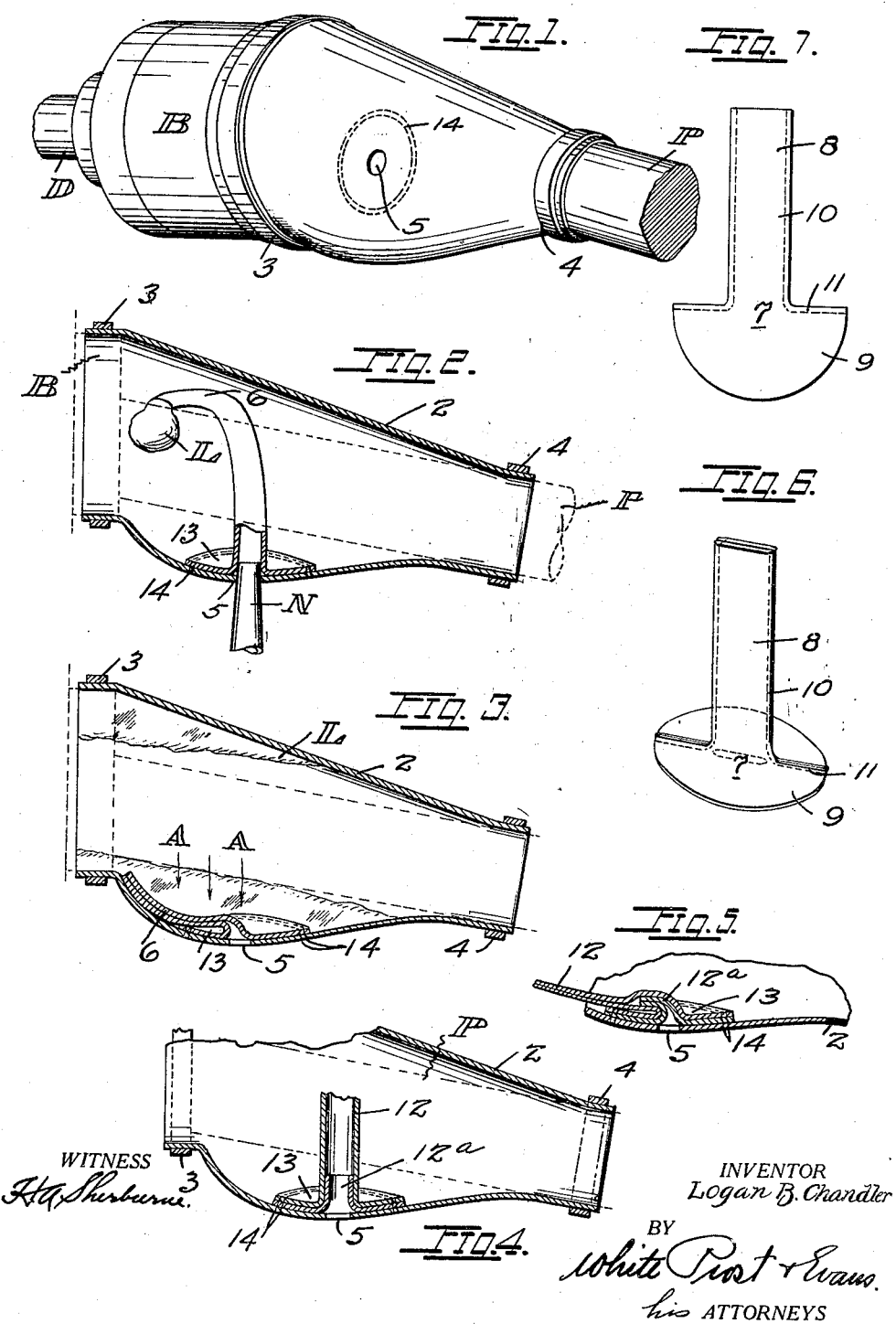

1,437,130

UNITED STATES PATENT OFFICE.

LOGAN B. CHANDLER, OF SAN FRANCISCO, CALIFORNIA.

BOOT AND VALVE.

Application filed July 14, 1920. Serial No. 396,164.

*To all whom it may concern:*

Be it known that I, LOGAN B. CHANDLER, a citizen of the United States, and a resident of the city and county of San Francisco, State of California, have invented a new and useful Boot and Valve, of which the following is a specification.

This invention relates to a device for retaining a lubricant at or about a mechanical joint and more particularly pertains to a so-called "boot" for universal joints of machinery, especially universal joints of road vehicles, although it is to be understood that the invention is equally applicable to various machines in which an universal joint structure is utilized.

In the illustrated adaptation of the invention the structure is shown as combined with a portion of a mechanism including a driving and a driven shaft connected for relative angular movement by an universal joint. It is necessary to keep joints of this type thoroughly lubricated and, because of the peculiar relative motions of the shaft portions, an element of the joint forming a casing or socket is provided with a comparatively large aperture through which projects the associated shaft and a lubricating medium will freely escape from the socket or shell of the joint unless trapped or retained by a particular device, which, commonly, is in the form of a sleeve or boot projecting from the open side of the shell or socket of the joint and encompassing a contiguous portion of the shaft working through the opening.

The present invention has for an object to provide a valved boot or oil retaining device readily applicable to and efficiently serving the function of retaining a lubricant in an universal joint.

A further object of the invention is to provide an universal joint boot enabling the ready supply of oil or lubricant to the joint structure and further, it is an object to prevent the waste or loss of the lubricant from the joint structure.

Another object of the invention is to provide a boot for universal joint structures that is extremely simple in construction and, therefore, inexpensive in cost of manufacture and merchandising and which is devoid of loose and separable parts.

A further object of the invention is to provide an universal joint boot having a lateral filling port with a valve-like closure and, further, to provide a closure substantially in the form of an inwardly projecting spout or tube which serves, by reason of the nature of the material of which it is formed, as the valve to prevent loss or leaking of the lubricant.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:

Figure 1 is a perspective of the improved boot shown as applied to an universal joint structure.

Figure 2 is a longitudinal, central sectional view through the applied device showing the joint structure in dotted lines and showing a portion of a grease gun applied and the manner in which the lubricant is introduced into the boot chamber.

Fig. 3 is a central longitudinal section showing the position of the flexible tube during a rotation of the boot about its axis.

Fig. 4 is a sectional view of a fragment of a boot showing a modified form of the filling tube and valve.

Fig. 5 is a sectional view showing the form of device of Fig. 4 in the closed position.

Fig. 6 is a perspective of a form of a filling tube, and

Fig. 7 is a plan of a form of blank of which a filling tube may be constructed.

The invention is adapted to be applied to universal joint structures of various types and, obviously, the embodiment of the boot may be varied as determined by the type or construction of the universal joint, the latter of which need not be specifically described herein.

The invention is preferably incorporated in a sleeve or tube-like structure forming substantially a boot when applied with its larger end to the box B of an universal joint with the smaller end of the sleeve or boot secured about the propeller shaft P; the shell or box B being securely attached to a driving shaft D. The boot is preferably made of a pliant or flexible material upon which a lubricating substance will have little or no deleterious effect such material, for instance, being soft leather or suitably treated canvas or other equivalent material, so that the relative angular movement of the shafts D and P may occur with freedom and at the same time permit a substantially tight joint at the box B and about the shaft P.

The boot preferably comprises a tapering sleeve-like body 2 of suitable length, the larger end of which is snugly applicable to the box B about which it may be bound or clamped by a ring 3 or other suitable means and the smaller end of the sleeve or boot 2 is adapted to be snugly contracted by the shaft P and secured by a ring or clamp 4 or other suitable means. In this manner the boot forms a flexible closure or housing extending beyond the open end of the box B through which the propeller shaft P extends.

To the accomplishment of the several objects of the present invention the boot 2 is provided at one side with a port 5, of suitable diameter, into which may be inserted the nozzle N of a suitable grease gun, so that a lubricating substance may be injected into the boot and supplied to the universal joint.

A feature of the invention consists in a device, preferably arranged within the boot 2 and coincident with the port 5, which device functions as a valve to normally close the port and which opens comparatively freely to permit the injection of the grease from the gun nozzle.

A highly efficient, extremely simple and durable, form of closure may be secured by the provision of a nipple-like inwardly extending spout or tube, preferably formed of flexible and pliant material disposed with one end about the port 5 so that grease may flow freely through the spout or tube, as shown in Fig. 2. Such a filling spout is indicated at 6 and may be formed of a pliant material; such as soft leather or canvas, or other material not readily effected by the lubricant, and the tube 6 may be constructed by stitching together sections of material, a blank form of which section is indicated at 7 in Fig. 7 as having an elongated shank 8 and a semicircular base portion 9 with its diametrical edge at right angles to the longitudinal edges of the shank 8. Two of such shanks may be superposed and stitched along the lines 10 and 11, thus forming a flat tubular portion 12, Fig. 6, from one end of which there may be turned outwardly base-forming flanges 13 and these, in turn, may be stitched as at 14, Fig. 2, to the inner portion of the boot so that the intake end of the tube 12 registers with the port 5. Preferably, the tube 12 is somewhat longer than the diameter of the boot 2 in a plane extending transversely through the boot and intersecting the port 5 so that the nipple or tube 12 is normally bent and thus is caused to be substantially constantly closed by the bringing of the walls of the tube 12 upon each other, as in a folded position, clearly shown in Fig. 3. This folding acts in coordination with the natural flat structure of the tube, as shown in Fig. 6, to cause the tube to act as a flap valve, efficiently preventing the return or outward flow of the lubricant through the tube 12 and out of the port 5.

During the rotation of the universal joint structure, the lubricant may be caused to assume a position, indicated at L, by centrifugal force and held against the annular wall of the boot during which time the pressure of the lubricant acting in the direction of the arrows A, Fig. 3, further serves to close the tube and prevent loss by leakage.

In Figs. 4 and 5, a slightly modified form of the invention is illustrated in which there is a double valve feature obtained by providing within the tube 12 a shorter and inner nipple-like tube or spout 12ª, similar to the tube 12 except that it is shorter. In Fig. 4 the valve-forming tubes are shown in the open position assumed by the injection of the lubricant and in Fig. 5 the tubes are shown in the sealing or closed position.

It is obvious that the length and form of construction and the kind of material may be varied and the parts may be combined and arranged as expedient or desired.

I claim:

1. An universal joint boot of pliant material having a filling port, and an interior valve for said port comprising a collapsible tube.

2. An universal joint boot having a filling port, and an interior valve for said port comprising a short collapsible tube, and a second and longer collapsible tube surrounding said short tube.

3. An universal joint boot of pliant material having a filling port, and a flexible tube of normally flat cross-section leading from the port into the boot.

4. An universal joint boot of pliant material having a filling port and a pair of telescoped tubes of normally flat cross-section and formed of pliant material leading from the port into the boot, the tubes having superposed flared bases for attachment to the boot wall.

In testimony whereof, I have hereunto set my hand.

LOGAN B. CHANDLER.